No. 669,805. Patented Mar. 12, 1901.
M. POTTER.
COUPLING FOR BRAKE SHAFTS.
(Application filed Nov. 27, 1900.)
(No Model.)
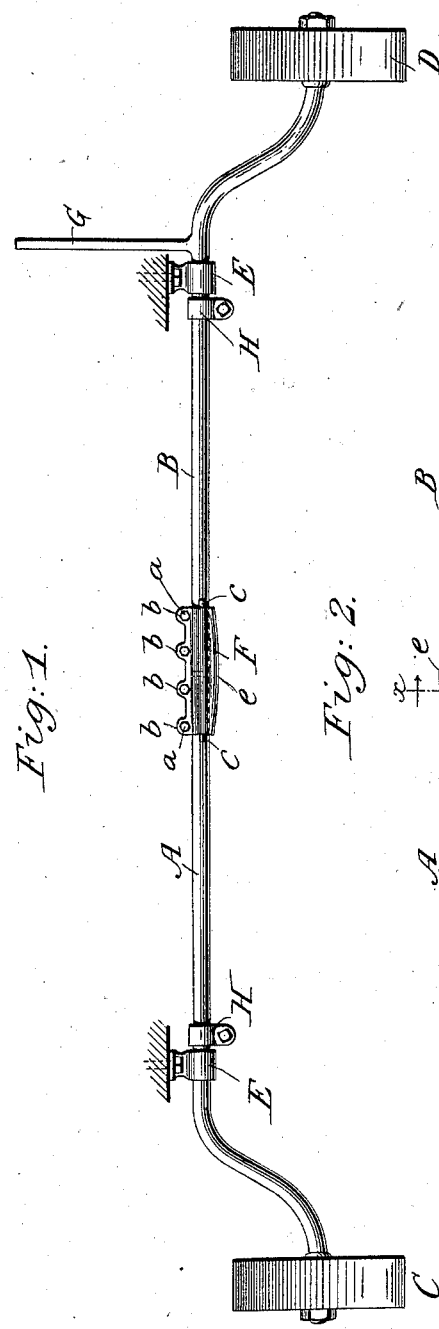
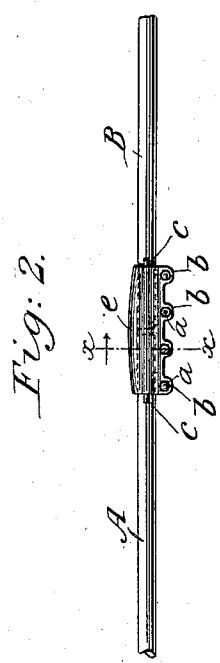
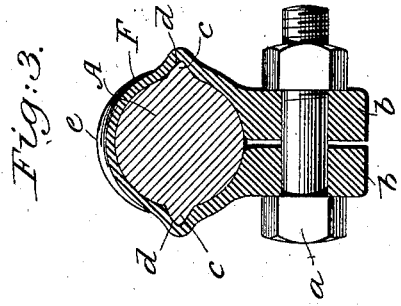
Witnesses:
John A. Rennie
C. A. Duffy
Inventor:
Morgan Potter,
By Worth Osgood
his Attorney.

UNITED STATES PATENT OFFICE.

MORGAN POTTER, OF FISHKILL-ON-THE-HUDSON, NEW YORK.

COUPLING FOR BRAKE-SHAFTS.

SPECIFICATION forming part of Letters Patent No. 669,805, dated March 12, 1901.

Application filed November 27, 1900. Serial No. 37,888. (No model.)

*To all whom it may concern:*

Be it known that I, MORGAN POTTER, a citizen of the United States, residing at Fishkill-on-the-Hudson, in the county of Dutchess and State of New York, have invented certain new and useful Improvements in Couplings for Brake-Shafts, of which the following is a full, clear, and exact specification, reference being had to the accompanying drawings and to the letters of reference marked thereon.

My invention relates especially to couplings designed for use in connection with brake-shafts employed upon vehicles of various kinds, the shafts being divided or composed of two or more parts for purposes which will be hereinafter made clear.

The principal object of my invention is to provide a light but simple, safe, and reliable coupling for the parts of a brake-shaft, which when in place will make the shaft as secure as if in one piece, but which will permit the parts to be adjusted from or toward the center, so as to bring the brake-block on the outer extremities of the shaft to the proper accurate bearing upon the wheel-tires to compensate for wear or for changes in the dish of the wheels or for other similar purposes.

Subordinate objects of my invention are to make the coupling reversible on the inner portions of the shaft, so that the coupling may be used either side up, as may be desired, to strengthen the central part of the coupling, so that the extremities of the shaft within it when widely separated will be held without danger of weakening the coupling or causing it to yield or break, and to provide simple and efficient means for setting the coupling in place and securing it without unnecessarily increasing the weight of the coupling.

To accomplish the foregoing objects and to secure other and further advantages in the matters of construction, operation, and use, my improvements involve certain new and useful arrangements or combinations of parts and peculiarities of construction, as will be herein first fully described and then pointed out in the claims.

In the accompanying drawings, which form part of this specification, Figure 1 is a view in elevation of a brake-shaft for vehicles with the brake-blocks in place thereon, the same being shown as if applied upon a vehicle and having my improved form of coupling located thereon, the binding screws or bolts being shown on the upper side or toward the vehicle-body. Fig. 2 is a side view of a fragment of the shaft shown in Fig. 1, my improved coupling being represented thereon, but located in a position opposite that indicated in Fig. 1—that is, with the binding screws or bolts located on the under side of the shaft. Fig. 3 is a cross-section on a plane through line *x x* of Fig. 2, but on a much larger scale than previous figures, showing the side ribs or fins with which the extremities of the shaft are supplied and the manner in which the shaft is pinched and held by the coupling.

In all the figures like letters of reference wherever they occur indicate corresponding parts.

A and B represent two sections of a brake-shaft for vehicles, C and D brake-blocks of any desired form for bearing against the vehicle-wheels after the manner of ordinary brakes, and E E the hangers or bearings in which the shaft is sustained and in which it turns when brought into or out of use, the said hangers being suitably fixed to some rigid portion of the vehicle.

F is the coupling. This for cheapness of manufacture and ease of fitting is preferably made of cast malleable iron open at one portion throughout its length, and it is intended to snugly fit the extremities of the divided shaft and to be pinched thereon by suitable bolts, as *a a*, passing through the lips *b b*. The metal is sufficiently elastic so that when the nuts on the bolts *a a* are loosened the lips *b b* will spring apart, and thus loosen the grasp of the coupling upon the extremities of the shaft, so that these extremities may be moved out or in in the hangers to bring the brake-blocks or either of them to the desired location. When this adjustment is effected as desired, the coupling is pinched up by the bolts, and thus holds the two extremities of the shaft with the same security and rigidity as if the shaft were in one piece and not adjustable, as has heretofore been the ordinary custom of making these brake-shafts.

To compel the two parts of the shaft to turn together and to operate the same as if of one piece, the inner extremities of the shaft are provided on each side with projecting longitudinal ribs or fins c c, and these are located diametrically opposite each other, so that when the open portion of the coupling is turned either up or down the coupling receives the ends of the shaft with equal facility. These fins are preferably formed integrally with the portions of the shaft to which they pertain. This is merely for cheapness of manufacture; but obviously the ribs or fins might be made of separate pieces and set into the extremities of the shaft after the manner of ordinary splines or keys.

The coupling is suitably recessed on each side longitudinally, as at d, to receive the ribs or fins c, and these recesses are preferably formed in the coupling when it is cast, as by use of a suitable core, as is well understood. The coupling as it comes from the mold is thus ready for application, except for the perforations necessary to be made to receive the bolts a. Obviously the coupling might be made by other methods than casting; but these would be more expensive.

Of course it is desirable that the coupling should be as light as is consistent with its necessary strength and durability. For this reason it is that the material between the series of lips b is recessed or cut away, as indicated in Figs. 1 and 2.

If the coupling, made light, as above explained, were of equal thickness throughout its length, then as the extremities of the shaft within it were moved farther and farther apart the strain upon the shaft might break the coupling. To provide against this, I make the central part of the coupling a little thicker than the extremities, as indicated at e. This slight swell e may be extended all around the coupling, if desired; but ordinarily it will be found sufficient if extended only over the part opposite the lips b, for the part containing the lips if strong enough to withstand the pinching of the bolts will not be liable to be broken by any strain upon the brake-shaft. The coupling is thus thickened in the middle and reduced at the ends.

G represents any form of brake-lever by which the brake-shaft is moved to bring the brake-blocks into contact with the wheels or to carry them out of such contact. When this lever is moved, of course the shaft is turned in its bearings, the two parts of the shaft being similarly turned, since they are coupled by the means above described. The bearing of the blocks against the wheels causes the blocks to wear, and sometimes they wear to one side more than the other, and it becomes necessary or desirable to adjust them so that they will bear more properly against the tires. Again, in use the dish of the vehicle-wheels will change or is sometimes changed by resetting the tires, &c., making it necessary or desirable to again adjust the blocks. This adjustment is easily and quickly effected by use of my improved coupling. All that is necessary to do is to loosen the bolts a and at the same time to loosen the collars H H on the shaft. Then the parts of the shaft may be moved in or out in their hangers to bring the brake-blocks to the proper lines, after which the coupling is tightened up and the collars H slipped up against their adjacent hangers and there tightened in place by suitable set screws or bolts with which they are provided for the purpose. In Fig. 1 these collars are shown as slightly removed from contact with the hangers, as when in position to permit the adjustment of the separate parts of the shaft. When the collars are locked in proper place, it is obvious that the coupled shaft cannot move in the hangers toward one side or the other, and thus the shaft is maintained in working position precisely as if it were solid or of a single piece.

In many cases it is desirable to turn the coupling on the shaft so that the coupling-bolts will normally lie on the upper side of the shaft, as indicated in Fig. 1. In other cases this location or arrangement is impossible, owing to the formation of the vehicle-body or owing to some obstruction being located in the path of the coupling as it turns with the brake-shaft, and in such cases the coupling-bolts are located on the under side of the shaft, as indicated in Fig. 2. The reversal of the coupling upon the two parts of the shaft is not only possible, but easy and convenient, owing to the fins or ribs c being placed at diametrically opposite points on the sides of the shaft-sections, as above explained. The coupling may as easily be put in place one side up as the other, and in either position it will pinch and hold the shaft-sections with equal accuracy and rigidity. The double ribs or fins supply a double security against the twisting or yielding of the shaft-sections one with respect to the other, and thus make the coupling more secure than it would be with single ribs. Besides, with single ribs or fins or splines the coupling could not be reversed upon the shaft-sections as when constructed in accordance with my invention. With this form of coupling also the shaft and coupling need not be made to fit each other accurately, as is necessary when ordinary set-screws are employed; but any variation in size of the parts is compensated for by pinching the coupling.

In the ordinary forms of coupling employed for power-shafts there is no necessity of reversing the coupling upon the shaft, because the latter revolves completely and continuously in its bearings, and therefore a single spline or key is found sufficient in such couplings. In a brake-shaft for vehicles, however, the shaft never makes a complete revolution in its bearings, but only a partial revolution, depending in extent upon the extent of movements of the brake-lever, after which the shaft is allowed to return to its normal position.

While I have represented the brake-shaft as being supplied with a single coupling, two or more of the improved couplings may be utilized in connection with the shaft if the latter be divided at two or more points.

The improved coupling being constructed substantially as above explained will be found to admirably answer all the purposes or objects of the invention hereinbefore set forth and to afford obvious facilities in the matter of adjusting or locating and holding the brake-blocks in proper working position.

Having now fully described my invention, what I claim as new herein, and desire to secure by Letters Patent, is—

1. In combination with a partially-revoluble divided brake-shaft for vehicles, a coupling applied to the adjacent extremities of the parts of the shaft, the said parts being supplied with longitudinal ribs or fins on diametrically opposite sides, and the coupling having corresponding longitudinal side recesses and arranged to embrace the adjacent ends of the shaft-sections and to be pinched thereon and on the said ribs, substantially in the manner and for the purposes set forth.

2. In a coupling for brake-shafts supplied with diametrically-oppositely-located longitudinal side recesses and having a longitudinal opening, the coupling-bolts located in lips projecting from the body of the coupling and separated by recesses, the parts being combined with the partially-revoluble shaft-sections having longitudinal ribs and being reversible upon said sections, substantially as shown and described.

3. In combination with a partially-revoluble divided brake-shaft for vehicles, a coupling for the adjacent ends of the shaft-sections, said coupling having a longitudinal opening at one side and being supplied with coupling-bolts and constructed and arranged to be reversed upon the shaft-sections and to be pinched in place in either position, substantially as and for the purposes set forth.

4. The herein-described coupling for brake-shafts, the same being provided with the oppositely-located longitudinal side recesses and with the coupling-bolts, and being enlarged or swelled in the center and reduced at the extremities on the side opposite the location of the coupling-bolts, substantially as shown and for the purposes set forth.

In testimony whereof I have signed my name to this specification in the presence of two subscribing witnesses.

MORGAN POTTER.

Witnesses:
M. E. CURTISS,
THOMAS ALDRIDGE.